(12) United States Patent
Thiam et al.

(10) Patent No.: US 9,391,865 B1
(45) Date of Patent: Jul. 12, 2016

(54) SYSTEMS AND METHODS FOR FACILITATING FAULT-TOLERANT BACKUP JOBS

(71) Applicant: Symantec Corporation, Mountain View, CA (US)

(72) Inventors: Alioune Thiam, Hugo, MN (US); Girish Jorapurkar, Woodbury, MN (US)

(73) Assignee: Veritas Technologies LLC, Mountain View, CA (US)

( * ) Notice: Subject to any disclaimer, the term of this patent is extended or adjusted under 35 U.S.C. 154(b) by 437 days.

(21) Appl. No.: 14/032,615

(22) Filed: Sep. 20, 2013

(51) Int. Cl.
G06F 15/16 (2006.01)
H04L 12/26 (2006.01)
G06F 11/20 (2006.01)

(52) U.S. Cl.
CPC ............ *H04L 43/10* (2013.01); *G06F 11/2025* (2013.01)

(58) Field of Classification Search
CPC .................................................. G06F 11/2025
USPC .......................................................... 709/213
See application file for complete search history.

(56) References Cited

U.S. PATENT DOCUMENTS

| | | | | |
|---|---|---|---|---|
| 7,389,292 B2 * | 6/2008 | Prakash | ................ | G06F 3/0601 |
| 8,140,480 B1 * | 3/2012 | Tsaur | .................. | G06F 11/1464 707/648 |
| 8,359,493 B2 * | 1/2013 | Peng | ..................... | G06F 11/008 714/15 |
| 8,850,141 B2 * | 9/2014 | Zohar | ................. | G06F 11/2058 707/656 |
| 8,965,843 B2 * | 2/2015 | Weltman | ........... | G06F 17/30067 707/610 |
| 9,037,821 B1 * | 5/2015 | Shah | ..................... | G06F 3/0655 711/162 |
| 9,143,559 B2 * | 9/2015 | Raut | ................. | G06F 17/30575 |
| 9,223,797 B2 * | 12/2015 | Wang | ................... | G06F 11/1453 |
| 9,239,843 B2 * | 1/2016 | Agrawal | ........... | G06F 17/30159 |
| 9,239,870 B1 * | 1/2016 | Shang | ............... | G06F 17/30575 |
| 2007/0220303 A1 * | 9/2007 | Kimura | ............... | G06F 11/0709 714/4.11 |
| 2010/0214908 A1 * | 8/2010 | Ralev | .................. | G06F 11/2025 370/221 |
| 2011/0145207 A1 * | 6/2011 | Agrawal | ........... | G06F 17/30156 707/692 |
| 2012/0030513 A1 * | 2/2012 | Peng | .................... | G06F 11/2097 714/37 |
| 2015/0341205 A1 * | 11/2015 | Invernizzi | ............... | H04L 45/28 370/219 |

* cited by examiner

*Primary Examiner* — Hamza Algibhah
(74) *Attorney, Agent, or Firm* — ALG Intellectual Property, LLC

(57) ABSTRACT

A computer-implemented method for facilitating fault-tolerant backup jobs may include (1) receiving, at a media server, a backup assignment from a master server, (2) detecting a communication failure that inhibits communication between the media server and the master server, (3) initiating a backup job at the media server based at least in part on the backup assignment received from the master server, (4) caching, due at least in part to the communication failure, a catalog of the backup job at the media server instead of forwarding the catalog of the backup job to the master server in real-time during the backup job, and then (5) transferring the catalog of the backup job to the master server upon determining that communication between the media server and the master server is no longer inhibited. Various other methods, systems, and computer-readable media are also disclosed.

20 Claims, 7 Drawing Sheets

SYSTEMS AND METHODS FOR FACILITATING FAULT-TOLERANT BACKUP JOBS

BACKGROUND

Backup and restore technologies may include both a backup system and a replication system. For example, a backup system may capture a backup image of a client device and then store the backup image at a storage device in a local domain. In this example, a replication system may replicate the backup image by making a copy of the backup image and then moving the copy to another storage device in a remote domain. By moving this copy to the other storage device, the replication system may facilitate high availability of the backup image by ensuring that the backup image is always available at either the local domain or the remote domain even in the event that one of these domains experiences a failure and/or data corruption.

Unfortunately, management of separate backup and replication systems may be cumbersome and/or expensive. As a result, some backup and restore technologies may also include a master server that manages both the backup system and the replication system at a single point. However, since the master server manages both the backup system and the replication system at a single point, the master server may represent a single point of failure. In other words, in the event that the master server experiences a failure, these systems may be unable to successfully perform backup and/or replication jobs.

As such, the instant disclosure identifies and addresses a need for systems and methods for facilitating fault-tolerant backup and/or replication jobs that run even in the event that the master server experiences a failure or is temporarily unable to communicate with the backup and/or replication systems.

SUMMARY

As will be described in greater detail below, the instant disclosure generally relates to systems and methods for facilitating fault-tolerant backup jobs by temporarily caching catalogs of backup jobs at a media server instead of forwarding these catalogs to a master server in real-time during the backup jobs.

In one example, a computer-implemented method for facilitating fault-tolerant backup jobs may include (1) receiving, at a media server, a backup assignment from a master server, (2) detecting a communication failure that inhibits communication between the media server and the master server, (3) initiating a backup job at the media server based at least in part on the backup assignment received from the master server, (4) caching, due at least in part to the communication failure, a catalog of the backup job at the media server instead of forwarding the catalog of the backup job to the master server in real-time during the backup job, and then (5) transferring the catalog of the backup job to the master server upon determining that communication between the media server and the master server is no longer inhibited.

In some embodiments, the communication failure may include a failure of a communication infrastructure that facilitates communication between the media server and the master server. In other embodiments, the communication failure may include a failure of the master server.

In some examples, the method may also include monitoring a heartbeat of the master server. In such examples, the method may further include detecting an unexpected absence of the heartbeat of the master server while monitoring the heartbeat of the master server. Additionally or alternatively, the method may include determining that communication between the media server and the master server is inhibited based at least in part on the unexpected absence of the heartbeat.

In some examples, the method may also include scheduling the backup job to be initiated by the media server at a specific time based at least in part on the backup assignment received from the master server. In such examples, the method may further include initiating the backup job at the scheduled time. Additionally or alternatively, the method may include scheduling at least one additional backup job to be performed by at least one additional media server based at least in part on the backup assignment received from the master server.

In some examples, the method may also include capturing a backup image of at least one client device in communication with the media server. In such examples, the method may further include storing the backup image at the media server.

In some examples, the method may also include making a copy of the backup image stored at the media server. In such examples, the method may further include transferring the copy of the backup image to at least one other server in a remote domain to facilitate replication of the backup image at the remote domain. Additionally or alternatively, the method may include updating the catalog at the media server to identify the other server at which the backup image has been replicated during the replication job.

In one embodiment, a system for implementing the above-described method may include (1) a reception module that receives, at a media server, a backup assignment from a master server, (2) a detection module that detects a communication failure that inhibits communication between the media server and the master server, (3) a backup module that (i) initiates a backup job at the media server based at least in part on the backup assignment received from the master server and then (ii) caches, due at least in part to the communication failure, a catalog of the backup job at the media server instead of forwarding the catalog of the backup job to the master server in real-time during the backup job, and (4) a transfer module that transfers the catalog of the backup job to the master server upon determining that communication between the media server and the master server is no longer inhibited. The system may also include at least one processor configured to execute the reception module, the detection module, the backup module, and the transfer module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, at a media server, a backup assignment from a master server, (2) detect a communication failure that inhibits communication between the media server and the master server, (3) initiate a backup job at the media server based at least in part on the backup assignment received from the master server, (4) cache, due at least in part to the communication failure, a catalog of the backup job at the media server instead of forwarding the catalog of the backup job to the master server in real-time during the backup job, and then (5) transfer the catalog of the backup job to the master server upon determining that communication between the media server and the master server is no longer inhibited.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
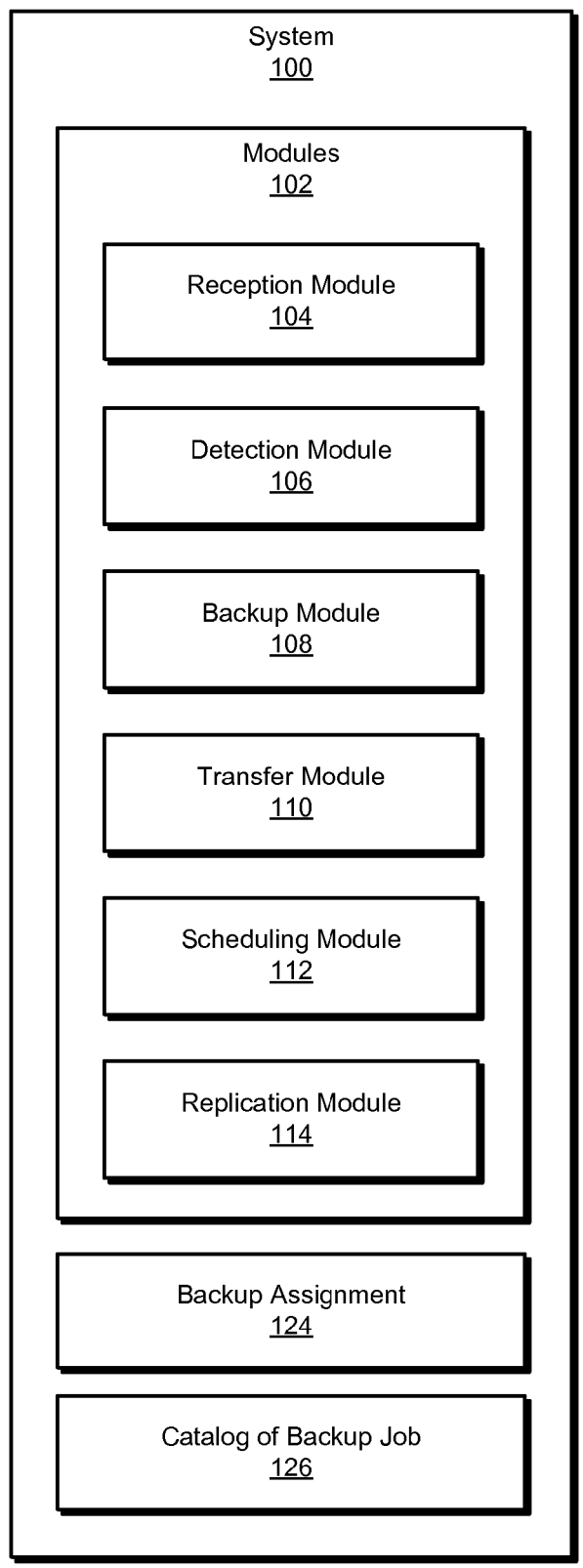
FIG. 1 is a block diagram of an exemplary system for facilitating fault-tolerant backup jobs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating fault-tolerant backup jobs. As will be explained in greater detail below, by receiving a backup assignment at a media server, the various systems and methods described herein may enable the media server to initiate a backup job even in the event that communication between the media server and the corresponding master server is inhibited. The various systems and methods described herein may also enable the media server to temporarily cache a catalog of the backup job at the media server until communication between the media server and the master server is no longer inhibited. By temporarily caching the catalog of the backup job at the media server, the various systems and methods described herein may enable the media server to complete the backup job and preserve the catalog even though communication between the media server and the master server was inhibited during the backup job.

Figure 2:
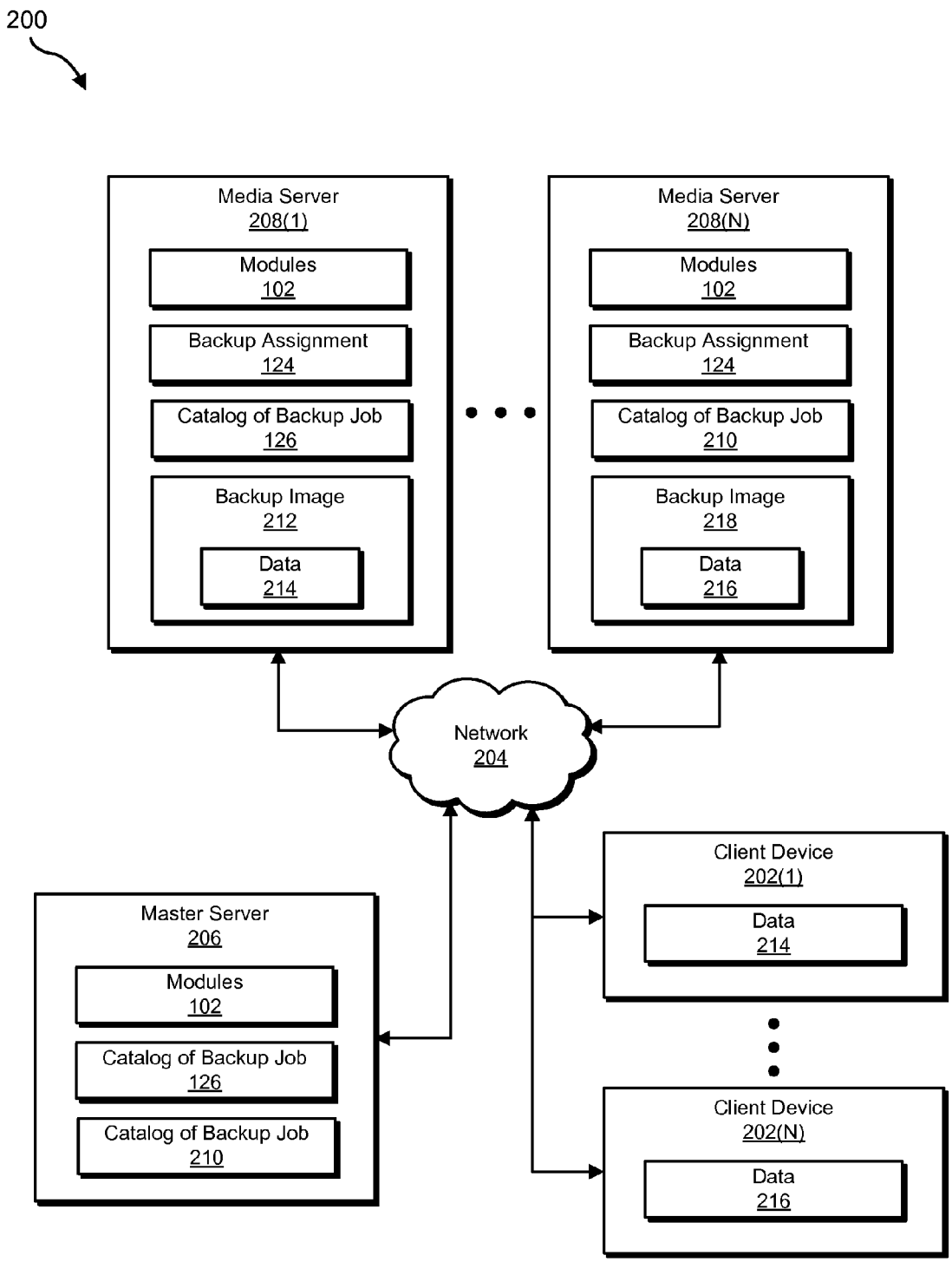
FIG. 2 is a block diagram of an additional exemplary system for facilitating fault-tolerant backup jobs.
Figure 3:
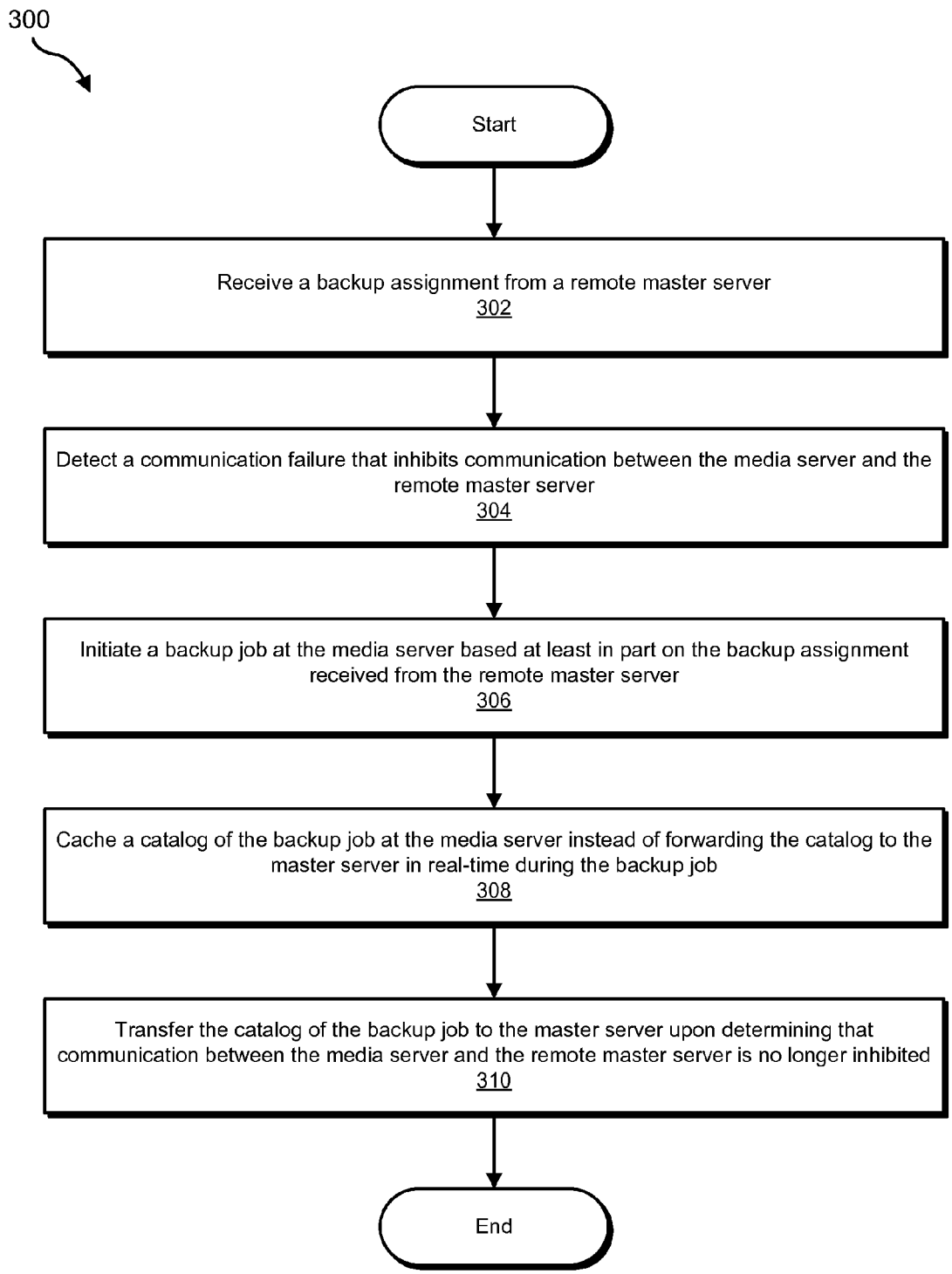
FIG. 3 is a flow diagram of an exemplary method for facilitating fault-tolerant backup jobs.
Figure 4:
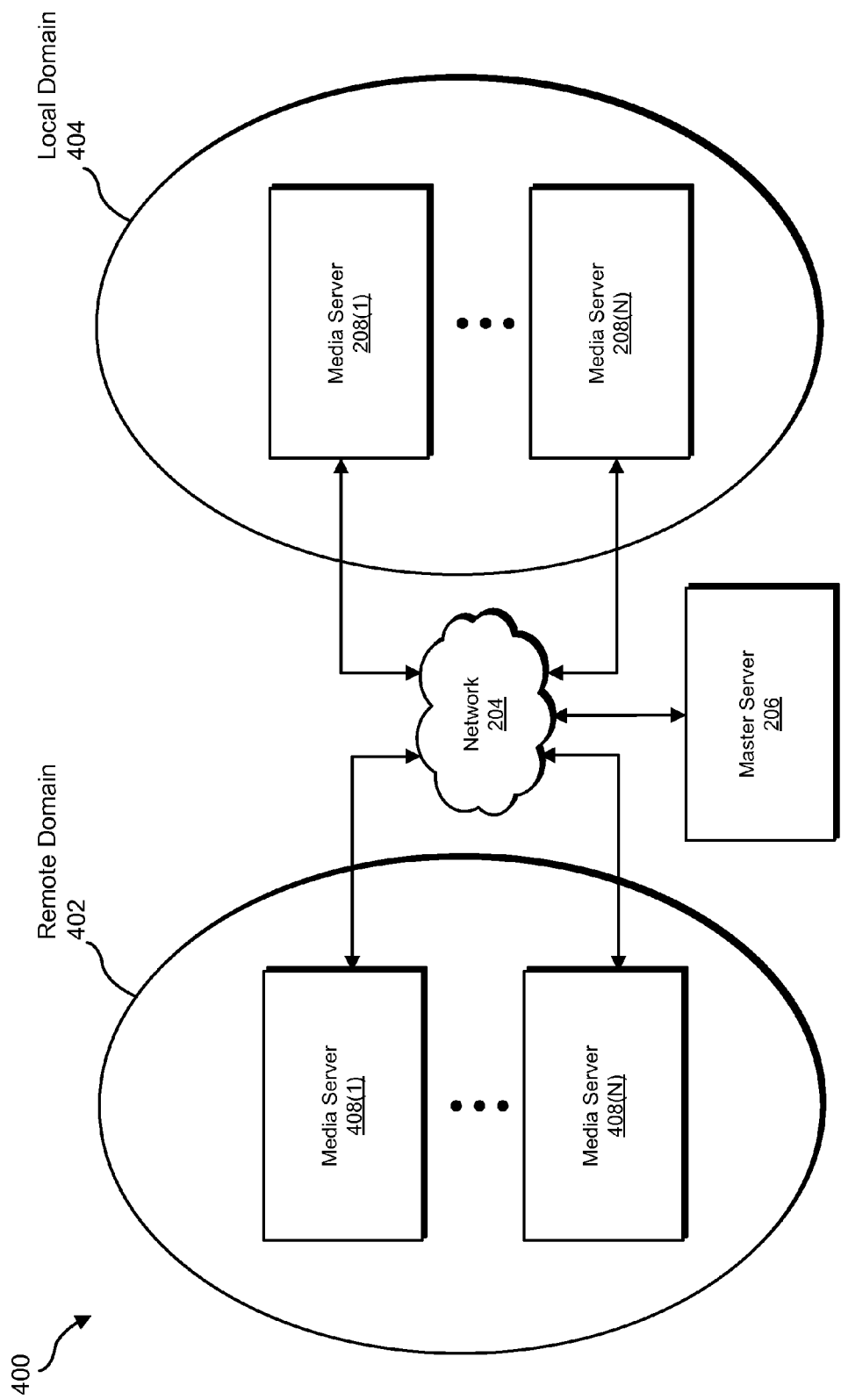
FIG. 4 is a block diagram of an additional exemplary system for facilitating fault-tolerant backup jobs.

The following will provide, with reference to FIGS. 1-2 and 4, detailed descriptions of exemplary systems for facilitating fault-tolerant backup jobs. Detailed descriptions of corresponding computer-implemented methods will be provided in connection with FIG. 3. Detailed descriptions of an exemplary catalog of a backup job will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for facilitating fault-tolerant backup jobs. As illustrated in this figure, exemplary system 100 may include one or more modules 102 for performing one or more tasks. For example, and as will be explained in greater detail below, exemplary system 100 may include a reception module 104 that receives, at a media server, a backup assignment from a master server. Exemplary system 100 may also include a detection module 106 that detects a communication failure that inhibits communication between the media server and the master server.

In addition, and as will be described in greater detail below, exemplary system 100 may include a backup module 108 that (1) initiates a backup job at the media server based at least in part on the backup assignment received from the master server and then (2) caches, due at least in part to the communication failure, a catalog of the backup job at the media server instead of forwarding the catalog of the backup job to the master server in real-time during the backup job. Exemplary system 100 may further include a transfer module 110 that transfers the catalog of the backup job to the master server to facilitate storing the catalog at the remote domain upon determining that communication between the media server and the master server is no longer inhibited.

Moreover, exemplary system 100 may include a scheduling module 112 that schedules the backup job to be initiated by the media server at a specific time based at least in part on the backup assignment received from the master server. Exemplary system 100 may also include a replication module 114 that initiates a replication job at the media server by (1) making a copy of the backup image stored at the media server and then (2) transferring the copy of the backup image to at least one other server in another domain to facilitate replication of the backup image at the other domain. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, or COMMVAULT SIMPANA).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(N), master server 206, and/or media servers 208(1)-(N)), media servers 408(1)-(N) in FIG. 4, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more backup assignments, such as backup assignment 124. The phrase "backup assignment," as used herein, generally refers to any type or form of data and/or information that directs or enables one or more media servers to schedule and/or perform one or more backup and/or replication jobs. The phrase "backup job," as used herein, generally refers to any type or form of task and/or operation that involves backing up at least a portion of the contents of one or more client and/or storage devices. The phrase "replication job," as used herein, generally refers to any type or form of task and/or operation that involves replicating at least a portion of the backed-up contents of one or more client and/or storage devices.

In some examples, backup assignment 124 may direct or enable one or more media servers (such as media servers 208(1)-(N) in FIG. 2) to perform backup jobs on one or more client devices (such as client devices 202(1)-(N) in FIG. 2). Additionally or alternatively, backup assignment 124 may also direct or enable the media servers to initiate replication jobs by (1) making copies of one or more backup images stored at the media servers and then (2) transferring the copies of the backup images to one or more other media servers to facilitate replication of the backup images. Although described as a single assignment, backup assignment 124 may represent a plurality of backup and/or replication assignments generated by the master server and/or distributed to the media servers at the same time or at distinct times.

The phrase "backup image," as used herein, generally refers to any type or form of file that includes a complete or partial copy of the contents and/or data located on a computing or storage device at a particular point in time. Examples of such backup images include, without limitation, full backup images, incremental backup images, differential backup images, accelerated backup images, deduplicated backup images, synthetic backup images, snapshots, combinations of one or more of the same, or any other suitable backup images.

As illustrated in FIG. 1, exemplary system 100 may also include one or more catalogs of backup jobs, such as a catalog of backup job 126. The term "catalog" and the phrase "catalog of backup job," as used herein, generally refer to any type or form of record and/or compilation that includes metadata and/or information about one or more backup and/or replication jobs. For example, catalog of backup job 126 may identify one or more files backed up during one or more backup jobs and/or replicated during one or more replication jobs. Additionally or alternatively, catalog of backup job 126 may identify one or more media servers that store the backed-up and/or replicated files. Catalog of backup job 126 may also facilitate restoring one or more client devices (such as client devices 202(1)-(N) in FIG. 2) based at least in part on the backed-up and/or replicated files stored at the media servers.

Exemplary system 100 in FIG. 1 may be implemented in a variety of ways. For example, all or a portion of exemplary system 100 may represent portions of exemplary system 200 in FIG. 2. As shown in FIG. 2, system 200 may include a master server 206 in communication with one or more media servers 208(1)-(N) via a network 204. System 200 may also include one or more client devices 202(1)-(N) in communication with media servers 208(1)-(N) via network 204.

As shown in FIG. 2, client devices 202(1)-(N) may include various data, such as data 214 and 216. In one example, data 214 may include all or a portion of the contents of client device 202(1). Additionally or alternatively, data 216 may include all or a portion of the contents of client device 202(N).

Media servers 208(1)-(N) may be programmed with one or more of modules 102 and/or include backup assignment 124. In one example, media server 208(1) may receive backup assignment 124 from master server 206 prior to a communication failure that inhibits communication between media server 208(1) and master server 206. Additionally or alternatively, media server 208(N) may receive backup assignment 124 from master server 206 prior to a communication failure that inhibits communication between media server 208(N) and master server 206.

As shown in FIG. 2, media servers 208(1)-(N) may also include one or more backup images, such as backup images 212 and 218. In one example, media server 208(1) may capture a backup image 212 that includes data 214 stored on client device 202(1) during a backup job. Additionally or alternatively, media server 208(N) may capture a backup image 218 that includes data 216 stored on client device 202(N) during a backup job.

As shown in FIG. 2, media servers 208(1)-(N) may also include one or more catalogs, such as catalog of backup job 126 and catalog of backup job 210. In one example, media server 208(1) may compile catalog of backup job 126 that includes metadata and/or information about backup image 212 captured during a backup job. Additionally or alternatively, media server 208(N) may compile catalog of backup job 210 that includes metadata and/or information about backup image 218 captured during a backup job.

Master server 206 may be programmed with one or more of modules 102 and/or include one or more of catalogs 126 and 210. In one example, master server 206 may receive catalog 126 from media server 208(1) after communication between media server 208(1) and master server 206 has been restored. Additionally or alternatively, master server 206 may receive catalog 210 from media server 208(N) after communication between media server 208(N) and master server 206 has been restored.

In one embodiment, one or more of modules 102 from FIG. 1 may, when executed by at least one processor of master server 206 and/or one or more of media servers 208(1)-(N), enable master server 206 and/or one or more of media servers 208(1)-(N) to facilitate fault-tolerant backup jobs. For example, and as will be described in greater detail below, one or more of modules 102 may cause media server 208(1) to (1) receive backup assignment 124 from master server 206, (2) detect a communication failure that inhibits communication between media server 208(1) and master server 206, (3) initiate a backup job at media server 208(1) based at least in part on backup assignment 124 received from master server 206, (4) cache, due at least in part to the communication failure, catalog of backup job 126 at media server 208(1) instead of forwarding catalog 126 to master server 206 in real-time during the backup job, and then (5) transfer catalog 126 to master server 206 upon determining that communication between media server 208(1) and master server 206 is no longer inhibited.

Client devices 202(1)-(N) generally represent any type or form of computing device capable of reading computer-executable instructions. Examples of media servers 208(1)-(N) include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Media servers 208(1)-(N) generally represent any type or form of computing device capable of backing up, storing, replicating, deduplicating, and/or restoring data and/or files. Examples of media servers 208(1)-(N) include, without limitation, backup servers, replication servers, deduplication servers, application servers, web servers, storage servers, security servers, and/or database servers configured to run certain software applications and/or provide various backup, replication, deduplication, web, storage, security, and/or database services.

Media servers 208(1)-(N) may also include one or more internal or external storage devices configured to store data and/or files. Examples of such storage devices include, without limitation, hard disk drives, solid-state drives, magnetic tape drives, optical disc drives, magneto-optical disc drives, deduplication storage systems, random-access-memory devices, combinations of one or more of the same, or any other type of volatile or non-volatile storage devices.

Master server 206 generally represent any type or form of computing device capable of managing media servers and/or storing catalogs that include metadata and/or information about backup and/or replication jobs. Examples of master server 206 include, without limitation, management servers, maintenance servers, backup servers, replication servers, deduplication servers, application servers, web servers, storage servers, security servers, and/or database servers configured to run certain software applications and/or provide various management, maintenance, backup, replication, deduplication, web, storage, security, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among client devices 202(1)-(N), master server 206, and/or media servers 208(1)-(N).

FIG. 3 is a flow diagram of an exemplary computer-implemented method 300 for facilitating fault-tolerant backup jobs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a backup assignment from a master server. For example, at step 302 reception module 104 may, as part of one or more of media servers 208(1)-(N) in FIG. 2, receive backup assignment 124 from master server 206. In this example, backup assignment 124 may direct or enable one or more of media servers 208(1)-(N) to schedule and/or perform one or more backup and/or replication jobs.

The systems described herein may perform step 302 in a variety of ways. In some examples, reception module 104 may receive backup assignment 124 from master server 206 prior to initiation of one or more backup jobs. For example, master server 206 may generate a backup job that involves backing up the contents of client device 202(1) at a specific time. In this example, master server 206 may assign the backup job to media server 208(1) and then add this assigned backup job to backup assignment 124.

Upon adding this assigned backup job to backup assignment 124, master server 206 may provide backup assignment 124 to media server 208(1) via network 204 in advance of the specific time. By providing backup assignment 124 to media server 208(1) in advance of the specific time, master server 206 may ensure that media server 208(1) is able to schedule, initiate, and/or complete the backup job at the specific time even in the event that media server 208(1) loses communication with master server 206 prior to initiation of or during the backup job. As backup assignment 124 reaches media server 208(1), reception module 104 may receive backup assignment 124.

Upon reception of backup assignment 124, scheduling module 112 may, as part of media server 208(1) in FIG. 2, schedule the backup job assigned to media server 208(1) via backup assignment 124. For example, scheduling module 112 may schedule the backup job to be initiated by media server 208(1) at the specific time identified by backup assignment 124. By scheduling the backup job to be initiated at the specific time, scheduling module 112 may enable media server 208(1) to initiate and/or complete the backup job in accordance with backup assignment 124 even in the event that media server 208(1) loses communication with master server 206 prior to initiation of or during the backup job.

Additionally or alternatively, master server 206 may generate a backup job that involves backing up the contents of client device 202(N) at a specific time. Master server 206 may assign the backup job to media server 208(N) and then add this assigned backup job to backup assignment 124.

Upon adding this assigned backup job to backup assignment 124, master server 206 may provide backup assignment 124 to media server 208(N) via network 204 in advance of the specific time. By providing backup assignment 124 to media server 208(N) in advance of the specific time, master server 206 may ensure that media server 208(N) is able to schedule, initiate, and/or complete the backup job at the specific time even in the event that media server 208(N) loses communication with master server 206 prior to initiation of or during the backup job. As backup assignment 124 reaches media server 208(N), reception module 104 may receive backup assignment 124.

Upon reception of backup assignment 124, scheduling module 112 may, as part of media server 208(N) in FIG. 2, schedule the backup job assigned to media server 208(N) via backup assignment 124. For example, scheduling module 112 may schedule the backup job to be initiated by media server 208(N) at the specific time identified by backup assignment 124. By scheduling the backup job to be initiated at the specific time, scheduling module 112 may enable media server 208(N) to initiate and/or complete the backup job in accordance with backup assignment 124 even in the event that media server 208(N) loses communication with master server 206 prior to initiation of or during the backup job.

In addition to being used to assign backup jobs, backup assignment 124 may also be used to assign one or more replication jobs. For example, master server 206 may generate a replication job that involves replicating the backed-up contents of client device 202(1) at a specific time or upon completion of the corresponding backup job. Master server 206 may assign the replication job to media server 208(1) and then add this assigned replication job to backup assignment 124.

Upon adding this assigned replication job to backup assignment 124, master server 206 may provide backup assignment 124 to media server 208(1) via network 204 in advance of the specific time or prior to completion of the corresponding backup job. By doing so, master server 206 may ensure that media server 208(1) is able to schedule, initiate, and/or complete the replication job even in the event that media server 208(1) loses communication with master server 206 prior to initiation of or during the replication job. As backup assignment 124 reaches media server 208(1), reception module 104 may receive backup assignment 124.

Upon reception of backup assignment 124, scheduling module 112 may, as part of media server 208(1) in FIG. 2, schedule the replication job assigned to media server 208(1) via backup assignment 124. For example, scheduling module 112 may schedule the replication job to be initiated by media server 208(1) at the specific time identified by backup assignment 124. By scheduling the backup job to be initiated at the specific time, scheduling module 112 may enable media server 208(1) to initiate and/or complete the replication job in accordance with backup assignment 124 even in the event that media server 208(1) loses communication with master server 206 prior to initiation of or during the replication job.

As will be described in greater detail below, the replication job may involve replicating at least a portion of the backed-up contents of client device 202(1) to one or more media servers in a remote domain. The term "domain," as used herein, generally refers to any type or form of physical site and/or location. In one example, a domain may represent a building or datacenter. In another example, a domain may represent a specific floor, level, division, or wing within the building or datacenter.

Additionally or alternatively, a domain may include a group of computing devices treated, managed, and/or administered as a unit. For example, a domain may include a group of media servers 208(1)-(N) managed under a set of common rules, procedures, and/or policies. In this example, the domain may be defined at least in part by a portion of an Internet Protocol (IP) address that is shared by the group of media servers 208(1)-(N).

As illustrated in FIG. 4, media servers 208(1)-(N) may be located at local domain 404. The phrase "local domain," as used herein, generally refers to any type or form of domain considered and/or observed from the perspective of one or more computing devices at or within the domain. In one example, local domain 404 may represent a datacenter at which media servers 208(1)-(N) are located.

As illustrated in FIG. 4, media servers 408(1)-(N) may be located at remote domain 402. Media servers 408(1)-(N) may represent any type or form of computing and/or storage devices capable of backing up, storing, replicating, deduplicating, and/or restoring data and/or files. The phrase "remote domain," as used herein, generally refers to any type or form of domain considered and/or observed from the perspective of one or more computing devices outside of the domain and/or within another domain. In one example, remote domain 402 may represent a datacenter at which media servers 408(1)-(N) are located.

In some embodiments, local domain 404 and remote domain 402 may represent different physical sites. For example, local domain 404 may represent a datacenter in Los Angeles, Calif. In this example, remote domain 402 may represent a datacenter in Chicago, Ill.

In other embodiments, local domain 404 and remote domain 402 may represent different floors within the same building. For example, local domain 404 may represent the first floor of a building in Los Angeles, Calif. In this example, remote domain 402 may represent the second floor of the same building in Los Angeles, Calif.

In some embodiments, master server 206 may be located at the same domain as one or more media servers. For example, master server 206 may be located at local domain 404 in FIG. 4 along with media servers 208(1)-(N). In another example, master server 206 may be located at remote domain 402 along with media servers 408(1)-(N).

In other embodiments, master server 206 may be located at another domain that is remote from the media servers. For example, master server 206 may be located at another domain that is remote from both local domain 404 and remote domain 402 in FIG. 4.

Returning to FIG. 3, at step 304 one or more of the systems described herein may detect a communication failure that inhibits communication between the media server and the master server. For example, at step 304 detection module 106 may, as part of one or more of media servers 208(1)-(N) in FIG. 2, detect a communication failure that inhibits communication between one or more of media servers 208(1)-(N) and master server 206. The phrase "communication failure," as used herein, generally refers to any type or form of failure and/or outage that results in the loss of communication between one or more computing devices.

Examples of such a communication failure include, without limitation, a failure of a master server, maintenance and/or repair of a master server, an outage of a domain that includes a master server, a failure of a communication infrastructure that facilitates communication between one or more media servers and a master server, maintenance and/or repair of a communication infrastructure that facilitates communication between one or more media servers and a master server, combinations of one or more of the same, or any other failure and/or outage that results in the loss of communication between one or more media servers and a master server.

The systems described herein may perform step 304 in a variety of ways. In some examples, detection module 106 may monitor a heartbeat of master server 206. The term "heartbeat," as used herein, generally refers to any type or form of periodic signal that indicates whether a computing device is healthy and/or able to communicate via a network. Failure to detect the heartbeat of master server 206 may indicate that master server 206 is unhealthy and/or unable to communicate via network 204.

While monitoring the heartbeat of master server 206, detection module 106 may detect an unexpected absence of the heartbeat of master server 206. For example, detection module 106 may fail to receive a timely heartbeat from master server 206 via network 204. As a result, detection module 106 may determine that communication between one or more of media servers 208(1)-(N) and master server 206 is inhibited and/or otherwise unavailable.

In some embodiments, detection module 106 may detect the communication failure prior to initiation of one or more backup and/or replication jobs assigned via backup assignment 124. In other embodiments, detection module 106 may detect the communication failure during one or more backup and/or replication jobs assigned via backup assignment 124.

In some examples, detection module 106 may receive a notification indicating that master server 206 has experienced a failure and/or is unable to communicate with one or more of media servers 208(1)-(N). For example, detection module 106 may receive a notification from another computing device (not illustrated in FIG. 2 or 4) included in the same domain as master server 206. This notification may indicate that master server 206 has experienced a failure and/or is unable to communicate with one or more of media servers 208(1)-(N) via network 204.

In some examples, detection module 106 may receive a notification indicating that master server 206 will been taken offline for maintenance reasons. For example, detection module 106 may receive a notification from master server 206 via network 204. This notification may indicate that master server 206 will be taken offline for scheduled maintenance prior to initiation of or during one or more backup and/or replication jobs assigned to one or more of media servers 208(1)-(N).

Returning to FIG. 3, at step 306 one or more of the systems described herein may initiate a backup job at the media server based at least in part on the backup assignment received from the master server. For example, at step 306 backup module 108 may, as part of media server 208(1) in FIG. 2, initiate a backup job based at least in part on backup assignment 124 received from master server 206. In this example, the backup job may involve backing up at least a portion of the contents of one or more of client devices 202(1)-(N).

The systems described herein may perform step 306 in a variety of ways. In some examples, backup module 108 may capture a backup image of one or more of client devices 202(1)-(N). In one example, backup module 108 may capture backup image 212 of client device 202(1) at the scheduled backup time. For example, backup module 108 may direct a backup agent installed on client device 202(1) to make a copy of data 214 stored on client device 202(1) and then transfer the copy of data 214 to media server 208(1) via network 204. As media server 208(1) receives the copy of data 214 from client device 202(1), backup module 108 may store the copy of data 214 in backup image 212 on media server 208(1).

In another example, backup module 108 may, as part of media server 208(N) in FIG. 2, capture backup image 218 of client device 202(N) at the scheduled time. For example, backup module 108 may direct a backup agent installed on client device 202(N) to make a copy of data 216 stored on client device 202(N) and then transfer the copy of data 216 to media server 208(N) via network 204. As media server 208(N) receives the copy of data 216 from client device 202(N), backup module 108 may store the copy of data 216 in backup image 218 on media server 208(N).

In some examples, backup module 108 may capture a snapshot of data managed by a filer (such as NETAPP filer) accessible to and/or in communication with one or more of client devices 202(1)-(N). The term "filer," as used herein, generally refers to any type or form of storage management system that manages data stored in a storage array (such as intelligent storage array 795 in FIG. 7). In one example, backup module 108 may direct the filer to take a snapshot of data backed up to a storage array (not illustrated in FIG. 2) and then transfer the snapshot to media server 208(1) via network 204. As media server 208(1) receives the snapshot from the filer, backup module 108 may store the snapshot as backup image 212 on media server 208(1).

In some embodiments, the communication failure may have no disruptive effect on any scheduled backup jobs or backup jobs that are currently in progress. For example, in the event that the communication failure is detected prior to the initiation of the scheduled backup job, backup module 108 may initiate the backup job despite the communication failure. In the event that the communication failure is detected during the backup job, backup module 108 may continue performing the backup job despite the communication failure.

Returning to FIG. 3, at step 308 one or more of the systems described herein may cache a catalog of the backup job at the media server instead of forwarding the catalog of the backup job to the master server in real-time during the backup job. For example, at step 308 backup module 108 may, as part of media server 208(1) in FIG. 2, cache catalog of backup job 126 at media servers 208(1) instead of forwarding the catalog to master server 206 in real-time during the backup job. In this example, backup module 108 may elect to cache catalog of backup job 126 at media server 208(1) due at least in part to the communication failure inhibiting communication between media server 208(1) and master server 206.

The term "caching" or "to cache," as used herein, generally refers to any type or form of storage process that involves storing a catalog of a backup job on a temporary basis. The term "real-time," as used herein, generally refers to any type or form of timing sequence, reference, and/or measurement in which one or more tasks and/or operations are performed immediately or near-immediately.

The systems described herein may perform step 308 in a variety of ways. In some examples, backup module 108 may record and/or compile various metadata and/or information about the backup job assigned to media server 208(1). Backup module 108 may then store the metadata and/or information as catalog of backup job 126 at media server 208(1). Catalog of backup job 126 may facilitate restoring data 214 to client device 202(1) based at least in part on backup image 212.

Figure 5:
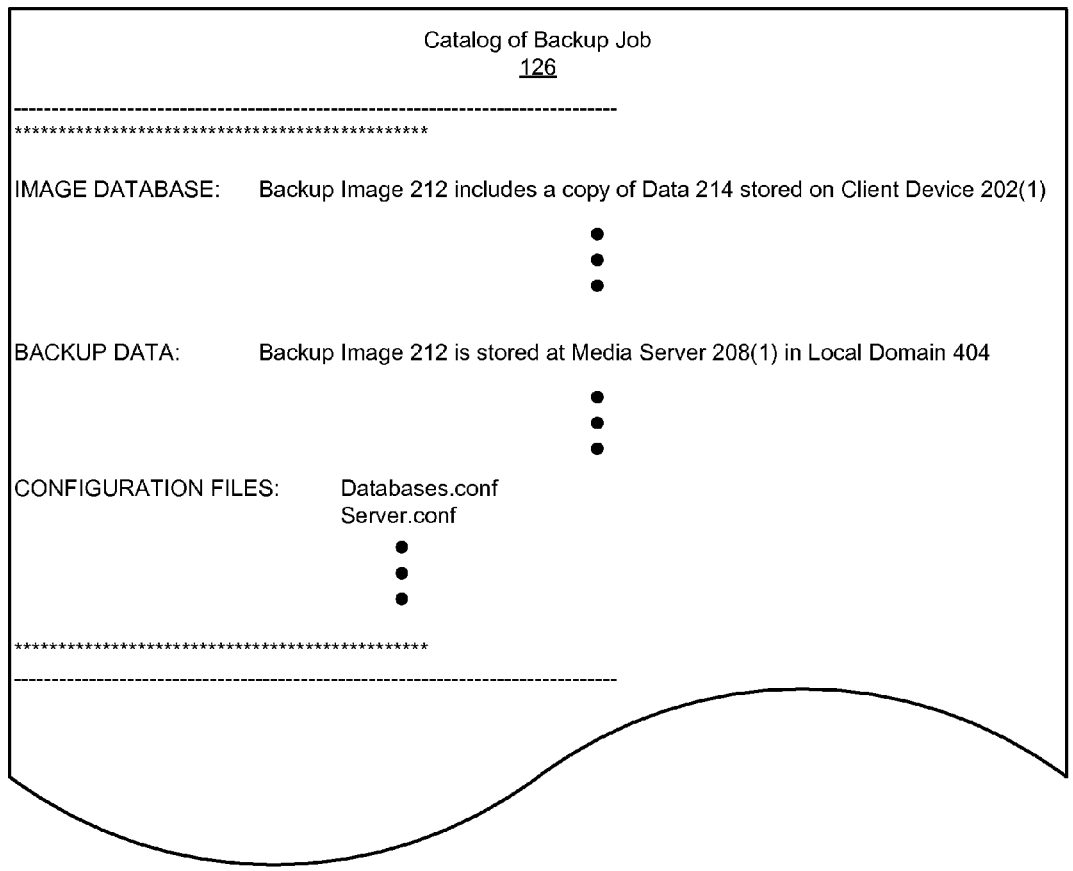
FIG. 5 is an illustration of an exemplary catalog of a backup job.

As illustrated in FIG. 5, catalog of backup job 126 may include an image database that identifies the data backed up during at least one backup job (in this example, "Backup image 212 includes a copy of Data 214 stored on Client Device 202(1)," and so on), backup data that identifies the storage media that stores the data (in this example, "Backup Image 212 is stored at Media Server 208(1) in Local Domain 404," and so on), and/or configuration files that identify the configuration of and/or settings applied to the storage media and/or the client device that stores the data (in this example, "Databases.conf," "Server.conf," and so on).

In a similar example, backup module 108 may, as part of media server 208(N) in FIG. 2, record and/or compile metadata and/or information about the backup job assigned to media server 208(N). Backup module 108 may then store the metadata and/or information as catalog of backup job 210 at media server 208(N). Catalog of backup job 210 may facilitate restoring data 216 to client device 202(N) based at least in part on backup image 218.

In some examples, replication module 114 may, as part of media server 208(1) in FIG. 2, initiate the replication job assigned to media server 208(1) via backup assignment 124. For example, replication module 114 may make a copy of backup image 212 stored at media server 208(1) in local domain 404. Replication module 114 may then direct media server 208(1) in local domain 404 to transfer the copy of backup image 212 to media server 408(1) in remote domain 402 via network 204. By directing media server 208(1) to transfer the copy of backup image 212 to media server 408(1), replication module 114 may facilitate replication of backup image 212 at remote domain 402. Media server 408(1) may receive the copy of backup image 212 from media server 208(1) and then store the copy of backup image 212 to complete the replication job.

Additionally or alternatively, replication module 114 may update catalog 126 at media server 208(1) in local domain 404 to identify media server 408(1) in remote domain 402 at which backup image 212 has been replicated during the replication job. For example, replication module 114 may update catalog 126 to indicate that backup image 212 has been replicated to media server 408(1) in remote domain 402. By doing so, replication module 114 may facilitate using catalog 126 to restore data 214 to client device 202(1) based at least in part on the copy of backup image 212 stored at remote domain 402.

In some embodiments, the replication job may involve replicating data stored on a storage array in a local domain to a remote storage array in a remote domain. For example, replication module 114 may direct a filer that manages a storage array (not illustrated in FIG. 4) at local domain 404 in FIG. 4 to take a snapshot of data backed up to the storage array and then transfer the snapshot to a remote storage array (not illustrated in FIG. 4) at remote domain 402 in FIG. 4 via network 204. By directing the filer to transfer the snapshot to the remote storage array at remote domain 402, replication module 114 may facilitate replication of the backed-up data at remote domain 402.

In some embodiments, the communication failure may have no disruptive effect on any scheduled replication jobs or replication jobs that are currently in progress. For example, in the event that the communication failure is detected prior to the initiation of the scheduled replication job, replication module 114 may initiate the replication job despite the communication failure. In the event that the communication failure is detected during the replication job, replication module 114 may continue performing the replication job despite the communication failure.

Returning to FIG. 3, at step 310 one or more of the systems described herein may transfer the catalog of the backup job to the master server upon determining that communication between the media server and the master server. For example, at step 310 transfer module 110 may, as part of media server 208(1) in FIG. 2, transfer catalog of backup job 126 to master server 206 via network 204 once communication between media server 208(1) and master server 206 is no longer inhibited. By transferring catalog of backup job 126 to master server 206, transfer module 110 may facilitate storing catalog of backup job 126 at the master server 206.

The systems described herein may perform step 310 in a variety of ways. In some examples, transfer module 110 may receive a notification indicating that communication between media server 208(1) and master server 206 is no longer inhibited. For example, detection module 106 may, as part of media server 208(1) in FIG. 2, continue monitoring the heartbeat of master server 206. While monitoring the heartbeat of master server 206, detection module 106 may detect a renewed presence of the heartbeat of master server 206. As a result, detection module 106 may determine that communication between media server 208(1) and master server 206 has returned and/or is no longer inhibited.

Upon determining that communication between media server 208(1) and master server 206 has returned, detection module 106 may notify transfer module 110 that the communication failure has been resolved. For example, detection module 106 may generate a notification indicating that the communication failure has been resolved. Detection module 106 may then provide the notification to transfer module 110. In response to the notification, transfer module 110 may direct media server 208(1) to transfer catalog of backup job 126 to master server 206 via network 204.

In another example, master server 206 may notify transfer module 110 that the communication failure has been resolved. For example, in the event that master server 206 was replaced and/or taken offline for maintenance reasons, master server 206 may generate a notification indicating that the communication failure has been resolved once master server 206 is brought back online. Master server 206 may then provide this notification to media server 208(1) via network 204. As this notification reaches media server 208(1), transfer module 110 may receive the notification and then direct media server 208(1) to transfer catalog of backup job 126 to master server 206 via network 204.

Upon receiving catalog of backup job 126 from media server 208(1), master server 206 may store catalog of backup job 126 to facilitate restoring data 214 to client device 202(1) based at least in part on backup image 212. Master server 206 may also merge catalog of backup job 126 with one or more other catalogs stored at the domain of master server 206. Additionally or alternatively, master server 206 may replicate catalog 126 to at least one other server at the domain of master server 206.

Similarly, transfer module 110 may transfer catalog of backup job 210 to master server 206 via network 204 once communication between media server 208(N) and master server 206 is no longer inhibited. For example, transfer module 110 may, as part of media server 208(N) in FIG. 2, receive a notification indicating that communication between media server 208(N) and master server 206 is no longer inhibited. In response to this notification, transfer module 110 may direct media server 208(N) to transfer catalog of backup job 210 to master server 206 via network 204. By directing media server 208(N) to transfer catalog of backup job 210 to master server 206, transfer module 110 may facilitate storing catalog of backup job 210 at master server 206.

Upon receiving catalog of backup job 210 from media server 208(N), master server 206 may store catalog of backup job 210 to facilitate restoring data 216 to client device 202(N) based at least in part on backup image 218. Master server 206 may also merge catalog of backup job 210 with one or more other catalogs (such as catalog of backup job 126) stored at the domain of master server 206. Additionally or alternatively, master server 206 may replicate catalog 210 to at least one other server at the domain of master server 206.

As explained above in connection with method 300 in FIG. 3, a backup and restore technology may enable one or more media servers at a local domain to perform backup and/or replication jobs even in the event that a remote master server experiences a failure. For example, during configuration, the remote master server may analyze the set of rules, procedures, and/or policies applied to the media servers at the local domain. The remote master server may then assign one or more backup and/or replication jobs to the media servers based at least in part on this analysis.

By assigning the backup and/or replication jobs to the media servers during configuration, the backup and restore technology may leverage the media servers for scheduling and/or initiating the backup and/or replication jobs in the event that the remote master server experiences a failure. Moreover, by leveraging the media servers in this way, the backup and restore technology may be able to achieve high availability of various backup, replication, and/or restore features without the need of clustering the master server. As a result, this backup and restore technology may prevent the master server from being a single point of failure while, at the same time, avoiding the complexity and/or costliness that comes with clustering the master server.

Figure 6:
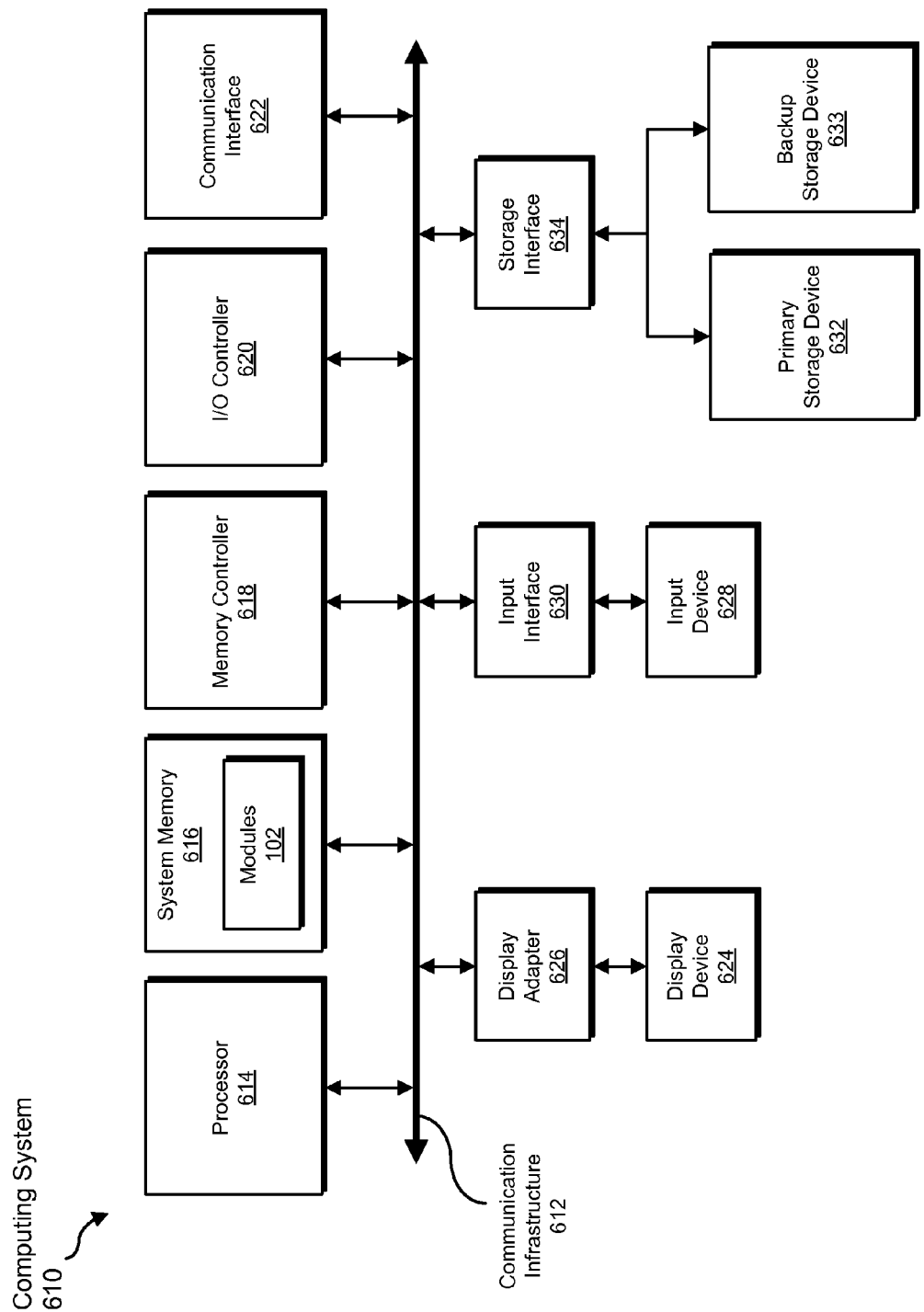
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
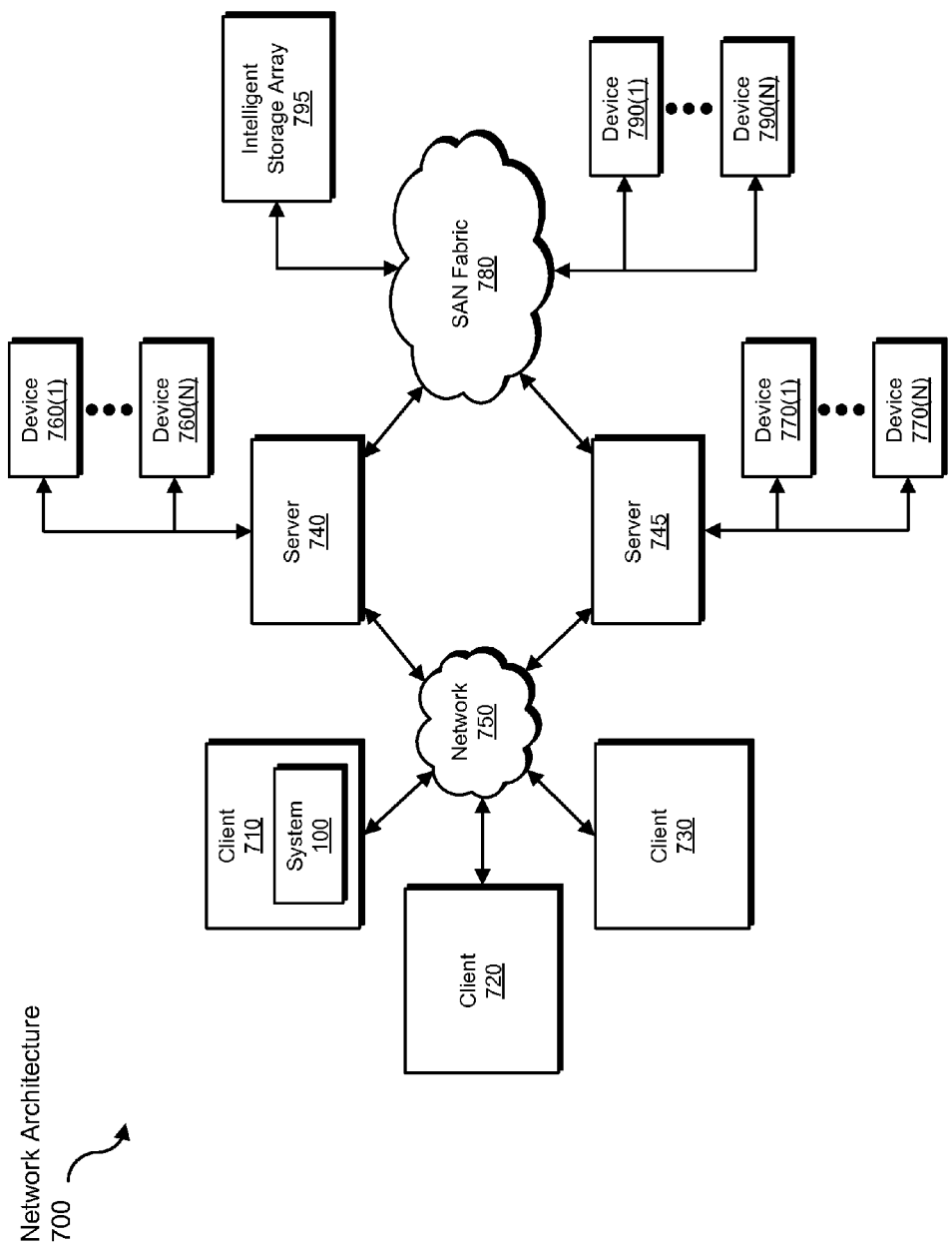
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for facilitating fault-tolerant backup jobs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed into a catalog, transform the data into the catalog, output a result of the transformation to a remote master server, use the result of the transformation to facilitate restoring a client device a based at least in part on the catalog, and store the result of the transformation to the remote master server for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for facilitating fault-tolerant backup jobs, at least a portion of the method being performed by a computing device comprising at least one processor, the method comprising:
   receiving, at a media server, a backup assignment from a master server;
   after receiving the backup assignment from the master server:
      detecting a communication failure that inhibits communication between the media server and the master server;
      initiating a backup job at the media server based at least in part on the backup assignment received from the master server;
      caching, due at least in part to the communication failure, a catalog of the backup job at the media server instead of forwarding the catalog of the backup job to the master server in real-time during the backup job;
      upon determining that communication between the media server and the master server is no longer inhibited, transferring the catalog of the backup job to the master server to facilitate storing the catalog at the master server.

2. The method of claim 1, wherein detecting the communication failure that inhibits communication between the media server and the master server comprises:
   monitoring a heartbeat of the master server;
   while monitoring the heartbeat of the master server, detecting an unexpected absence of the heartbeat of the master server;
   determining, based at least in part on the unexpected absence of the heartbeat, that communication between the media server and the master server is inhibited.

3. The method of claim 1, wherein the communication failure that inhibits communication between the media server and the master server comprises at least one of:
   a failure of a communication infrastructure that facilitates communication between the media server and the master server;
   a failure of the master server.

4. The method of claim 1, further comprising scheduling the backup job to be initiated by the media server at a specific time based at least in part on the backup assignment received from the master server;
   wherein initiating the backup job at the media server comprises initiating the backup job at the scheduled time.

5. The method of claim 4, further comprising scheduling at least one additional backup job to be performed by at least one additional media server based at least in part on the backup assignment received from the master server.

6. The method of claim 1, wherein initiating the backup job at the media server comprises:
   capturing a backup image of at least one client device in communication with the media server;
   storing the backup image at the media server.

7. The method of claim 6, further comprising initiating a replication job at the media server by:
   making a copy of the backup image stored at the media server;
   transferring the copy of the backup image to at least one other server in a remote domain to facilitate replication of the backup image at the remote domain.

8. The method of claim 7, wherein caching the catalog of the backup job at the media server comprises updating the catalog at the media server to identify the other server at which the backup image has been replicated during the replication job.

9. A system for facilitating fault-tolerant backup jobs, the system comprising:
   a reception module that receives, at a media server, a backup assignment from a master server;
   a detection module that detects a communication failure that inhibits communication between the media server and the master server;
   a backup module that:
      initiates a backup job at the media server based at least in part on the backup assignment received from the master server;
      caches, due at least in part to the communication failure, a catalog of the backup job at the media server instead of forwarding the catalog of the backup job to the master server in real-time during the backup job;
   a transfer module that transfers, in response to a determination that communication between the media server and the master server is no longer inhibited, the catalog of the backup job to the master server to facilitate storing the catalog at the master server;
   at least one processor that executes the reception module, the detection module, the backup module, and the transfer module.

10. The system of claim 9, wherein the detection module further:
    monitors a heartbeat of the master server;
    detects, while monitoring the heartbeat of the master server, an unexpected absence of the heartbeat of the master server;
    determines, based at least in part on the unexpected absence of the heartbeat, that communication between the media server and the master server is inhibited.

11. The system of claim 9, wherein the communication failure that inhibits communication between the media server and the master server comprises at least one of:
    a failure of a communication infrastructure that facilitates communication between the media server and the master server;
    a failure of the master server.

12. The system of claim 9, further comprising a scheduling module that schedules the backup job to be initiated by the media server at a specific time based at least in part on the backup assignment received from the master server;
    wherein the backup module further initiates the backup job at the scheduled time.

13. The system of claim 12, wherein the scheduling module further schedules at least one additional backup job to be performed by at least one additional media server based at least in part on the backup assignment received from the master server.

14. The system of claim 9, wherein the backup module further:
  captures a backup image of at least one client device in communication with the media server;
  stores at least a portion of the backup image at the media server.

15. The system of claim 14, further comprising a replication module that initiates a replication job at the media server by:
  making a copy of the backup image stored at the media server;
  transferring the copy of the backup image to at least one other server in a remote domain to facilitate replication of the backup image at the remote domain.

16. The system of claim 15, wherein the replication module further updates the catalog at the media server to identify the other server at which the backup image has been replicated during the replication job.

17. A non-transitory computer-readable medium comprising one or more computer-executable instructions that, when executed by at least one processor of a media server in a local domain, cause the media server to:
  receive a backup assignment from a master server;
  after receiving the backup assignment from the master server:
    detect a communication failure that inhibits communication between the media server and the master server;
    initiate a backup job at the media server based at least in part on the backup assignment received from the master server;
    cache, due at least in part to the communication failure, a catalog of the backup job instead of forwarding the catalog of the backup job to the master server in real-time during the backup job;
    transfer, in response to a determination that communication between the media server and the master server is no longer inhibited, the catalog of the backup job to the master server to facilitate storing the catalog at the master server.

18. The computer-readable medium of claim 17, wherein the computer-executable instructions further cause the media server to:
  monitor a heartbeat of the master server;
  while monitoring the heartbeat of the master server, detect an unexpected absence of the heartbeat of the master server;
  determine, based at least in part on the unexpected absence of the heartbeat, that communication between the media server and the master server is inhibited.

19. The computer-readable medium of claim 17, wherein the computer-executable instructions further cause the media server to:
  schedule the backup job to be initiated by the media server at a specific time based at least in part on the backup assignment received from the master server;
  initiate the backup job at the scheduled time.

20. The computer-readable medium of claim 17, wherein the computer-executable instructions further cause the media server to schedule at least one additional backup job to be performed by at least one additional media server in the local domain based at least in part on the backup assignment received from the master server.

\* \* \* \* \*